(12) United States Patent
Shin et al.

(10) Patent No.: US 12,443,015 B2
(45) Date of Patent: Oct. 14, 2025

(54) IMAGING LENS SYSTEM HAVING SEVEN LENSES OF +-+-- +- OR +-+-++- REFRACTIVE POWERS

(71) Applicant: SAMSUNG ELECTRO-MECHANICS CO., LTD., Suwon-si (KR)

(72) Inventors: Kil Soo Shin, Suwon-si (KR); Yong Joo Jo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 18/411,843

(22) Filed: Jan. 12, 2024

(65) Prior Publication Data

US 2024/0159992 A1   May 16, 2024

Related U.S. Application Data

(63) Continuation of application No. 17/578,775, filed on Jan. 19, 2022, now Pat. No. 11,906,707, which is a continuation of application No. 16/589,805, filed on Oct. 1, 2019, now Pat. No. 11,256,068.

(30) Foreign Application Priority Data

Jun. 17, 2019   (KR) .................. 10-2019-0071406

(51) Int. Cl.
 *G02B 13/00*   (2006.01)
 *G02B 9/64*   (2006.01)
(52) U.S. Cl.
 CPC ........... *G02B 13/0045* (2013.01); *G02B 9/64* (2013.01)

(58) Field of Classification Search
 CPC ............................. G02B 13/0045; G02B 9/64
 See application file for complete search history.

(56) References Cited

U.S. PATENT DOCUMENTS

| 10,656,380 B2 | 5/2020 | Chen |
| 10,670,837 B2 | 6/2020 | Kuo |
| 10,690,886 B2 | 6/2020 | Tang et al. |

(Continued)

FOREIGN PATENT DOCUMENTS

| CN | 204065539 U | 12/2014 |
| CN | 105445907 A | 3/2016 |

(Continued)

OTHER PUBLICATIONS

Korean Office Action issued on Sep. 4, 2020 in the corresponding Korean Patent Application No. 10-2019-0071406 (12 pages in English, 8 pages in Korean).

(Continued)

*Primary Examiner* — Wen Huang
(74) *Attorney, Agent, or Firm* — NSIP Law

(57) ABSTRACT

An imaging lens system includes a first lens, a second lens, a third lens, a fourth lens, a fifth lens, a sixth lens, and a seventh lens, sequentially disposed at intervals from an object side of the imaging lens system. The imaging lens system satisfies $1.5 < Nd5 < 1.6$, $30 < V5 < 50$, and $TTL/2IH < 0.730$, where Nd5 is a refractive index of the fifth lens, V5 is an Abbe number of the fifth lens, TTL is a distance from an object side surface of the first lens to an imaging plane, and 2IH is a diagonal length of the imaging plane.

6 Claims, 12 Drawing Sheets

(56) References Cited

U.S. PATENT DOCUMENTS

| | | |
|---|---|---|
| 11,256,068 B2 | 2/2022 | Shin et al. |
| 2014/0139719 A1 | 5/2014 | Fukaya |
| 2014/0376105 A1 | 12/2014 | Sekine |
| 2015/0009578 A1 | 1/2015 | Shinohara et al. |
| 2015/0198791 A1 | 7/2015 | Kubota et al. |
| 2016/0062086 A1 | 3/2016 | Tsai et al. |
| 2016/0241756 A1 | 8/2016 | Chen |
| 2017/0184822 A1 | 6/2017 | Shi |
| 2018/0188482 A1 | 7/2018 | Jhang et al. |
| 2019/0004285 A1 | 1/2019 | Tang et al. |
| 2019/0004288 A1 | 1/2019 | Kubota et al. |
| 2019/0025549 A1 | 1/2019 | Hsueh et al. |
| 2019/0025551 A1 | 1/2019 | Kuo |
| 2019/0079270 A1* | 3/2019 | Tseng ............ G02B 13/18 |
| 2019/0079273 A1 | 3/2019 | Kubota et al. |
| 2019/0094494 A1 | 3/2019 | Hsu et al. |
| 2019/0154974 A1 | 5/2019 | Chen |
| 2019/0155000 A1 | 5/2019 | Hashimoto |
| 2019/0170987 A1 | 6/2019 | Gao et al. |
| 2019/0227277 A1 | 7/2019 | Tang et al. |
| 2019/0227279 A1 | 7/2019 | Yang |
| 2020/0132969 A1 | 4/2020 | Huang |
| 2020/0209548 A1 | 7/2020 | Bian et al. |
| 2020/0209562 A1 | 7/2020 | Zhao et al. |
| 2020/0209565 A1* | 7/2020 | Guo ............ G02B 27/005 |
| 2020/0257084 A1* | 8/2020 | Dai ............ G02B 13/0045 |
| 2020/0363611 A1 | 11/2020 | Huang et al. |
| 2021/0033821 A1 | 2/2021 | Fukaya |
| 2021/0396955 A1* | 12/2021 | Okano ............ G02B 13/0045 |

FOREIGN PATENT DOCUMENTS

| | | |
|---|---|---|
| CN | 107621683 A | 1/2018 |
| CN | 107797232 A | 3/2018 |
| CN | 109212717 A | 1/2019 |
| CN | 109283657 A | 1/2019 |
| CN | 109828345 A | 5/2019 |
| JP | 2014-102408 A | 6/2014 |
| TW | I644142 B | 12/2018 |

OTHER PUBLICATIONS

Korean Office Action issued on Jul. 7, 2021 in counterpart Korean Patent Application No. 10-2021-0078506 (7 pages in English; 5 pages in Korean).

Chinese Office Action issued on Mar. 3, 2022, in counterpart Chinese Patent Application No. 201911407923.8 (6 pages in English and 9 pages in Chinese).

Korean Office Action issued on Jul. 6, 2022, in counterpart Korean Patent Application No. 10-2022-0042252 (9 Pages in English, 7 Pages in Korean).

Chinese Office Action Issued on Nov. 1, 2022, in counterpart Chinese Patent Application No. 201911407923.8 (8 Pages in Chinese, 8 Pages in English).

Korean Office Action issued on Jan. 27, 2023, in counterpart Korean Patent Application No. 10-2022-0042252 (7 pages in English, 5 pages in Korean).

Korean Office Action issued on Jul. 27, 2023, in counterpart Korean Patent Application No. 10-2022-0042252 (6 pages in English, 5 pages in Korean).

U.S. Appl. No. 17/578,775, filed Jan. 19, 2022, Shin et al.
U.S. Appl. No. 18/305,620, filed Apr. 24, 2023, Shin et al.
U.S. Office Action issued on Aug. 29, 2024, in related U.S. Appl. No. 18/305,620 (7 pages).
U.S. Office Action issued on Oct. 18, 2024, in related U.S. Appl. No. 18/305,620 (8 pages).
US Office Action issued on Apr. 17, 2025, in corresponding U.S. Appl. No. 18/305,620 (6 pages in English).

* cited by examiner

IMAGING LENS SYSTEM HAVING SEVEN LENSES OF +-+-- +- OR +-+-++- REFRACTIVE POWERS

CROSS-REFERENCE TO RELATED APPLICATIONS

This application is a continuation of U.S. application Ser. No. 17/578,775 filed on Jan. 19, 2022, now U.S. Pat. No. 11,906,707 issued on Feb. 20, 2024, which is a continuation of U.S. application Ser. No. 16/589,805 filed on Oct. 1, 2019, now U.S. Pat. No. 11,256,068 issued on Feb. 22, 2022, which claims the benefit under 35 USC 119(a) of Korean Patent Application No. 10-2019-0071406 filed on Jun. 17, 2019, in the Korean Intellectual Property Office, the entire disclosures of which are incorporated herein by reference for all purposes.

BACKGROUND

The following description relates to an imaging lens system including seven lenses.

A compact camera may be mounted on a wireless terminal. For example, the compact camera may be mounted on a front surface and a rear surface thereof, respectively. Such a compact camera is used for a variety of purposes such as outdoor scenery photography, indoor portrait photography and the like, such that performance that is not inferior to a general camera is required. However, it is difficult to realize high performance because a small camera is limited by a mounting space due to a size of a wireless terminal. Therefore, it is necessary to develop an imaging lens system capable of improving the performance of a compact camera without increasing the size of the compact camera.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, an imaging lens system includes a first lens, a second lens, a third lens, a fourth lens, a fifth lens, a sixth lens, and a seventh lens, sequentially disposed at intervals from an object side of the imaging lens system. The imaging lens system satisfies $1.5<Nd5<1.6$, $30<V5<50$, and $TTL/2IH<0.730$, where Nd5 is a refractive index of the fifth lens, V5 is an Abbe number of the fifth lens, TTL is a distance from an object side surface of the first lens to an imaging plane, and 2IH is a diagonal length of the imaging plane.

The imaging lens system may satisfy $10<V1-V3<10$, where V1 is an Abbe number of the first lens and V3 is an Abbe number of the third lens.

The imaging lens system may satisfy $25<V1-V4<45$, where V1 is an Abbe number of the first lens and V4 is an Abbe number of the fourth lens.

The imaging lens system may satisfy $0<V1-V5<20$, where V1 is an Abbe number of the first lens.

A refractive index of the fourth lens may be greater than 1.6.

The imaging lens system may satisfy $1.5<f3/f$, where f is a focal length of the imaging lens system and f3 is a focal length of the third lens.

The fourth lens may have negative refractive power.

The fifth lens may have a convex shape on an object side surface.

The imaging lens system may have an F-number of 2.0 or less.

In another general aspect, an imaging lens system includes a first lens, a second lens, a third lens, a fourth lens, a fifth lens, a sixth lens, and a seventh lens, sequentially disposed at intervals from an object side of the imaging lens system. An object side surface of the fourth lens or an object side surface of the fifth lens is concave, and an F-number is 2.0 or less. The imaging lens system satisfies $TTL/2IH<0.73$, where TTL is a distance from an object side surface of the first lens to an imaging plane and 2IH is a diagonal length of the imaging plane.

The third lens may have positive refractive power.

The fifth lens may have a concave shape on an image side surface.

The seventh lens may have a concave shape on an object side surface.

A refractive index of the fifth lens may be greater than 1.5 and less than 1.6.

The imaging lens system may satisfy $-10<V1-V3<10$, where V1 is an Abbe number of the first lens and V3 is an Abbe number of the third lens.

The imaging lens system may satisfy $0<V1-V5<20$, where V5 is an Abbe number of the fifth lens.

A refractive power of the first lens may be greater than a refractive power of the third lens, and a refractive power of the sixth lens may be greater than the refractive power of the third lens.

The first lens may have positive refractive power, the second lens may have negative refractive power, the third lens may have positive refractive power, the fourth lens may have negative refractive power, the sixth lens may have positive refractive power, and the seventh lens may have negative refractive power.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
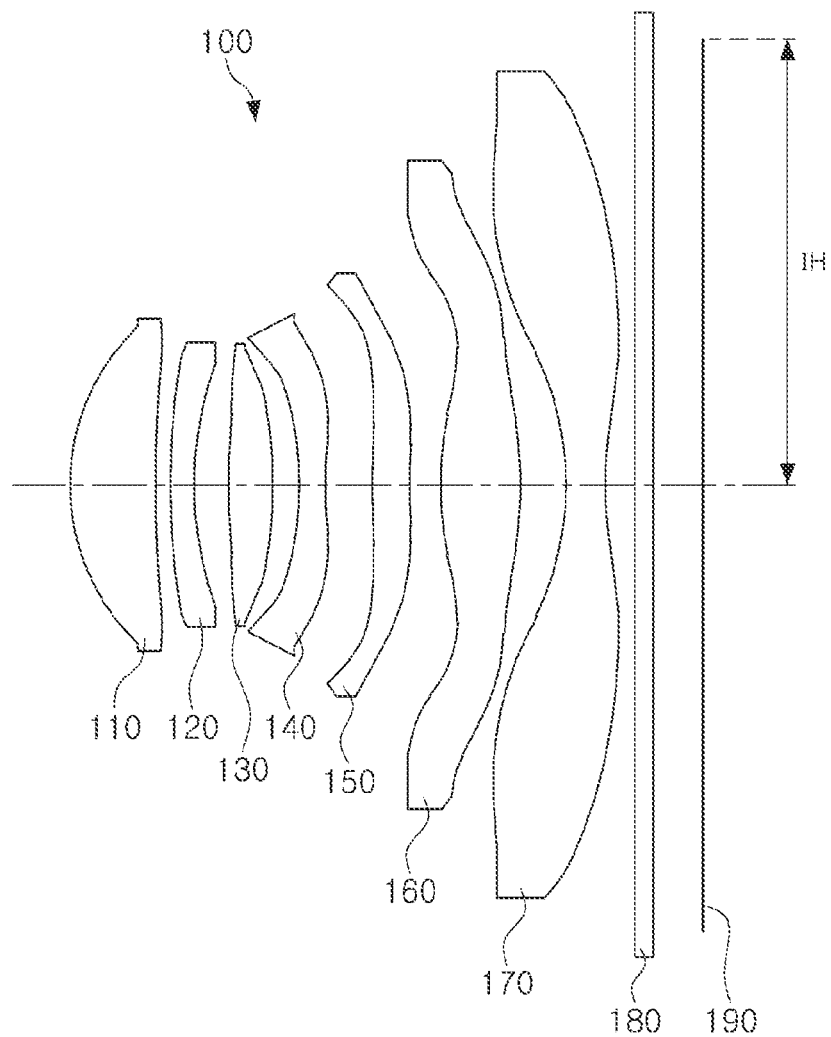
FIG. 1 is a configuration diagram of an imaging lens system according to a first example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Herein, a first lens means a lens closest to an object (or a subject), and a seventh lens means a lens closest to an imaging surface (or an image sensor). Herein, a unit of a curvature of radius, a thickness, TTL (a distance from an object side surface of the first lens to an imaging surface), 2IH (a diagonal length of the imaging surface), IH (½ of 2HI), and a focal length of the lens may be in millimeters (mm).

The thickness of the lens, the distance between the lenses, and the TTL are a distance from an optical axis of the lens. In an explanation of a shape of each lens, a convex shape of one surface may mean that a paraxial region of the surface may be convex, and a concave shape of one surface may mean that a paraxial region of the surface may be concave. Therefore, even when one surface of the lens is described as having a convex shape, an edge portion of the lens may be concave. Similarly, even when one surface of the lens is described as having a concave shape, an edge portion of the lens may be convex.

The imaging lens system includes seven lenses. For example, the imaging lens system may include a first lens, a second lens, a third lens, a fourth lens, a fifth lens, a sixth lens, and a seventh lens, sequentially disposed from an object side. The first to the seventh lenses are disposed with a predetermined interval between successive/adjacent lenses. For example, each lens does not contact an image side surface and an object side surface of a neighboring lens in the paraxial region. An F-number of the imaging lens system may be 2.0 or less.

The first lens has refractive power. For example, the first lens has positive refractive power. The first lens has a convex shape on one surface. For example, the first lens has a convex shape on an object side surface.

The first lens includes an aspherical surface. For example, both surfaces of the first lens may be aspherical. The first lens may be made of a material having high light transmittance and excellent workablility. For example, the first lens may be made of a plastic material. The first lens has a low refractive index. For example, the refractive index of the first lens may be less than 1.6.

The second lens has refractive power. For example, the second lens may have negative refractive power. The second lens has a convex shape on one surface. For example, the second lens may have a convex shape on an object side surface.

The second lens includes an aspherical surface. For example, both surfaces of the second lens may be aspherical. The second lens may be made of a material having high light transmittance and excellent workability. For example, the second lens may be made of a plastic material. However, the material of the second lens is not limited to plastic. For example, the second lens may be made of a plastic material. The second lens has a refractive index greater than the refractive index of the first lens. For example, the refractive index of the second lens may be 1.6 or greater. In addition, a lower limit value of the refractive index of the second lens may be further increased. For example, the refractive index of the second lens may be 1.67 or greater.

The third lens has refractive power. For example, the third lens has positive refractive power. At least one surface of the third lens may have a convex shape. For example, the third lens may have a convex shape on an object side surface.

The third lens includes an aspherical surface. For example, both surfaces of the third lens may be aspherical. The third lens may be made of a material having high light transmittance and excellent workability. For example, the third lens may be made of a plastic material. The third lens has a refractive index substantially similar to the refractive index of the first lens. For example, the refractive index of the third lens may be less than 1.6.

The fourth lens has refractive power. For example, the fourth lens has negative refractive power. The fourth lens has a concave shape on one surface. For example, the fourth lens may have a concave shape on an object side surface.

The fourth lens includes an aspherical surface. For example, both surfaces of the fourth lens may be aspherical. The fourth lens may be made of a material having high light transmittance and excellent workability. For example, the fourth lens may be made of a plastic material. The fourth lens has a refractive index greater than the refractive index of the first lens. For example, the refractive index of the fourth lens may be 1.6 or greater.

The fifth lens has refractive power. For example, the fifth lens may have positive or negative refractive power. The fifth lens has a convex shape on one surface. For example, the fifth lens may have a convex shape on an object side surface. The fifth lens may have a shape having an inflection point. For example, an inflection point may be formed on at least one surface of the object side surface and an image side surface of the fifth lens.

The fifth lens includes an aspherical surface. For example, both surfaces of the fifth lens may be aspherical. The fifth lens may be made of a material having high light transmittance and excellent workability. For example, the fifth lens may be made of a plastic material. The fifth lens may have a refractive index substantially similar to the refractive index of the first lens. For example, the refractive index of the fifth lens may be less than 1.6. As another example, the refractive index of the fifth lens may be greater than 1.5 and smaller than 1.6. An Abbe number of the fifth lens may be greater than 30 and less than 50.

The sixth lens has refractive power. For example, the sixth lens has positive refractive power. The sixth lens has a convex shape on one surface. For example, the sixth lens may have a convex shape on an object side surface. The sixth lens may have a shape having an inflection point. For example, an inflection point may be formed on at least one surface of the object side surface and the image side surface of the sixth lens.

The sixth lens includes an aspherical surface. For example, both surfaces of the sixth lens may be aspherical. The sixth lens may be made of a material having high light transmittance and excellent workability. For example, the sixth lens may be made of a plastic material. The sixth lens has a refractive index substantially similar to the refractive index of the fifth lens. For example, the refractive index of the sixth lens may be less than 1.6.

The seventh lens has refractive power. For example, the seventh lens has negative refractive power. The seventh lens may have a concave shape on at least one surface. For example, the seventh lens may have a concave shape on an object side surface. The seventh lens may have a shape having an inflection point. For example, one or more inflection points may be formed on at least one surface of the object side surface and the image side surface of the seventh lens.

The seventh lens includes an aspherical surface. For example, both surfaces of the seventh lens may be aspherical. The seventh lens may be made of a material having high light transmittance and excellent workability. For example, the seventh lens may be made of a plastic material. The seventh lens may have a refractive index substantially similar to the refractive index of the sixth lens. For example, the refractive index of the seventh lens may be less than 0.6.

The first to seventh lenses include aspherical surfaces as described above. The aspherical surfaces of the first to seventh lenses may be represented by the following Equation 1.

$$Z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} + Jr^{20} \qquad \text{Equation 1}$$

In Equation 1, c is a reciprocal of a radius of curvature of the lens, k is a conic constant, r is a distance from any point on an aspherical surface to an optical axis, A through J are aspherical surface constants, and Z (or SAG) is a height in an optical axis direction from any point on an aspheric surface to an apex of the aspheric surface.

The imaging lens system further includes a filter, an image sensor, and a stop.

The filter is disposed between the seventh lens and the image sensor. The filter may block some wavelengths of light. For example, the filter may block infrared light wavelengths. The image sensor forms an imaging plane on which light refracted through the first lens to the seventh lens may be formed. The image sensor converts an optical signal into an electrical signal. For example, the image sensor may convert an optical signal incident on the imaging plane into an electrical signal. The stop is disposed to adjust an amount of light incident on the lens. For example, the stop may be disposed between the first lens and the second lens or disposed between the second lens and the third lens.

The imaging lens system may satisfy at least one of the following conditional expressions.

| | |
|---|---|
| $0 < f1/f < 2.0$ | Conditional Expression 1: |
| $25 < V1\text{-}V2 < 45$ | Conditional Expression 2: |
| $-10 < V1\text{-}V3 < 10$ | Conditional Expression 3: |
| $25 < V1\text{-}V4 < 45$ | Conditional Expression 4: |
| $0 < V1\text{-}V5 < 20$ | Conditional Expression 5: |

| | |
|---|---|
| $-3.5 < f2/f < 0$ | Conditional Expression 6: |
| $1.5 < f3/f$ | Conditional Expression 7: |
| $f4/f < 0$ | Conditional Expression 8: |
| $f5/f < 0$ | Conditional Expression 9: |
| $0 < f6/f$ | Conditional Expression 10: |
| $f7/f < 0$ | Conditional Expression 11: |
| $TTL/f < 1.4$ | Conditional Expression 12: |
| $-1.0 < f1/f2 < 0$ | Conditional Expression 13: |
| $-2.0 < f2/f3 < 0$ | Conditional Expression 14: |
| $BFL/f < 0.4$ | Conditional Expression 15: |
| $D12/f < 0.1$ | Conditional Expression 16: |
| $SD5/IH < 0.6$ | Conditional Expression 17: |
| $0.7 < SD6/IH$ | Conditional Expression 18: |
| $0.8 < SD7/IH$ | Conditional Expression 19: |
| $TTL/2IH < 0.730$ | Conditional Expression 20: |
| $30 < V5 < 50$ | Conditional Expression 21: |

In the imaging lens system, the refractive power of the first lens is greater than the refractive power of the third lens, and the refractive power of the sixth lens is greater than the refractive power of the third lens. For example, the first lens, the third lens, and the sixth lens may satisfy all of the following conditional expressions.

| | |
|---|---|
| $1/f3 < 1/f1$ | Conditional Expression 22: |
| $1/f3 < 1/f6$ | Conditional Expression 23: |

In the conditional expressions, f is a focal length of the imaging lens system, f1 is a focal length of the first lens, f2 is a focal length of the second lens, f3 is a focal length of the third lens, f4 is a focal length of the fourth lens, f5 is a focal length of the fifth lens, f6 is a focal length of the sixth lens, and f7 is a focal length of the seventh lens, V1 is an Abbe number of the first lens, V2 is an Abbe number of the second lens, V3 is an Abbe number of the third lens, V4 is an Abbe number of the fourth lens, and V5 is an Abbe number of the fifth lens, TTL is a distance from an object side surface of the first lens to an imaging plane, BFL is a distance from an image side surface of the seventh lens to an imaging plane, D12 is a distance from the image side surface of the first lens to an object side surface of the second lens, SD5 is an effective radius of the fifth lens, SD6 is an effective radius of the sixth lens, and 2IH is a diagonal length of the imaging plane.

Conditional expression 1 is a condition for limiting appropriate refractive power of the first lens. The first lens that is outside of a numerical range of the conditional expression increases a focal length of the imaging lens system, making miniaturization of the imaging lens system difficult. Conditional expressions 2 to 5 are conditions for reducing chromatic aberrations of the imaging lens system. Conditional expressions 6 to 11 are conditions for limiting appropriate refractive power of the second lens to the seventh lens, respectively. A lens that is outside of the numerical range of the conditional expressions is too high or too low to correct aberrations through each lens. Conditional expressions 12 and 15 are conditions for miniaturization of the imaging lens system. The imaging lens system that is outside of the upper limit value of the conditional expression is not suitable for a portable terminal because the distance from the object side surface of the first lens to the imaging plane is outside of the range that can be mounted on the portable terminal or the focal length of the imaging lens system is too short. Conditional expressions 13 and 14 are conditions for limiting an appropriate focal length of the first lens to the third lens. A lens that is outside of the numerical value of the conditional expression may cause aberration characteristics to deteriorate because the refractive power thereof may be too high. Conditional expression 16 is a condition for reducing chromatic aberrations through the first lens and the second lens. For example, if a distance between the first lens and the second lens is outside of the upper limit value of the conditional expression, it is difficult to improve the chromatic aberrations according to Abbe number deviation of the first lens and the second lens. Conditional expressions 17 to 19 are conditions for reducing a flare phenomenon. If effective radii of the fifth lens to the seventh lens are outside of the upper limit value or the lower limit value of the conditional expression, a sweep angle of each lens becomes wider, such that flare characteristics may be deteriorated.

An imaging lens system according to a first example will be described with reference to FIG. 1.

An imaging lens system 100 includes a first lens 110, a second lens 120, a third lens 130, a fourth lens 140, a fifth lens 150, a sixth lens 160, and a seventh lens 170.

The first lens 110 has positive refractive power, and the first lens 110 has a convex shape on an object side surface and a concave shape on an image side surface. The second lens 120 has negative refractive power, and the second lens 120 has a convex shape on an object side surface and a concave shape on an image side surface. The third lens 130 has positive refractive power, and the third lens 130 has a convex shape on an object side surface and a convex shape on an image side surface. The fourth lens 140 has negative refractive power, and the fourth lens 140 has a concave shape on an object side surface and a concave shape on an image side surface. The fifth lens 150 has negative refractive power, and the fifth lens 150 has a convex shape on an object side surface and a concave shape on an image side surface. Further, the fifth lens 150 has a shape in which an inflection point is formed on the object side surface and the image side surface. The sixth lens 160 has positive refractive power, and the sixth lens 160 has a convex shape on an object side surface and a convex shape on an image side surface. Further, the sixth lens 160 has a shape in which an inflection point is formed on the object side surface and the image side surface. The seventh lens 170 has negative refractive power, and the seventh lens 170 has a concave shape on an object side surface and a concave shape on an image side surface. Further, the seventh lens 170 has a shape in which an inflection point is formed on the object side surface and the image side surface.

The imaging lens system 100 further includes a filter 180 and an image sensor 190. The filter 180 is disposed between the seventh lens 170 and the image sensor 190. For reference, although not shown in the drawings, a stop may be disposed between the second lens 120 and the third lens 130.

Figure 2:
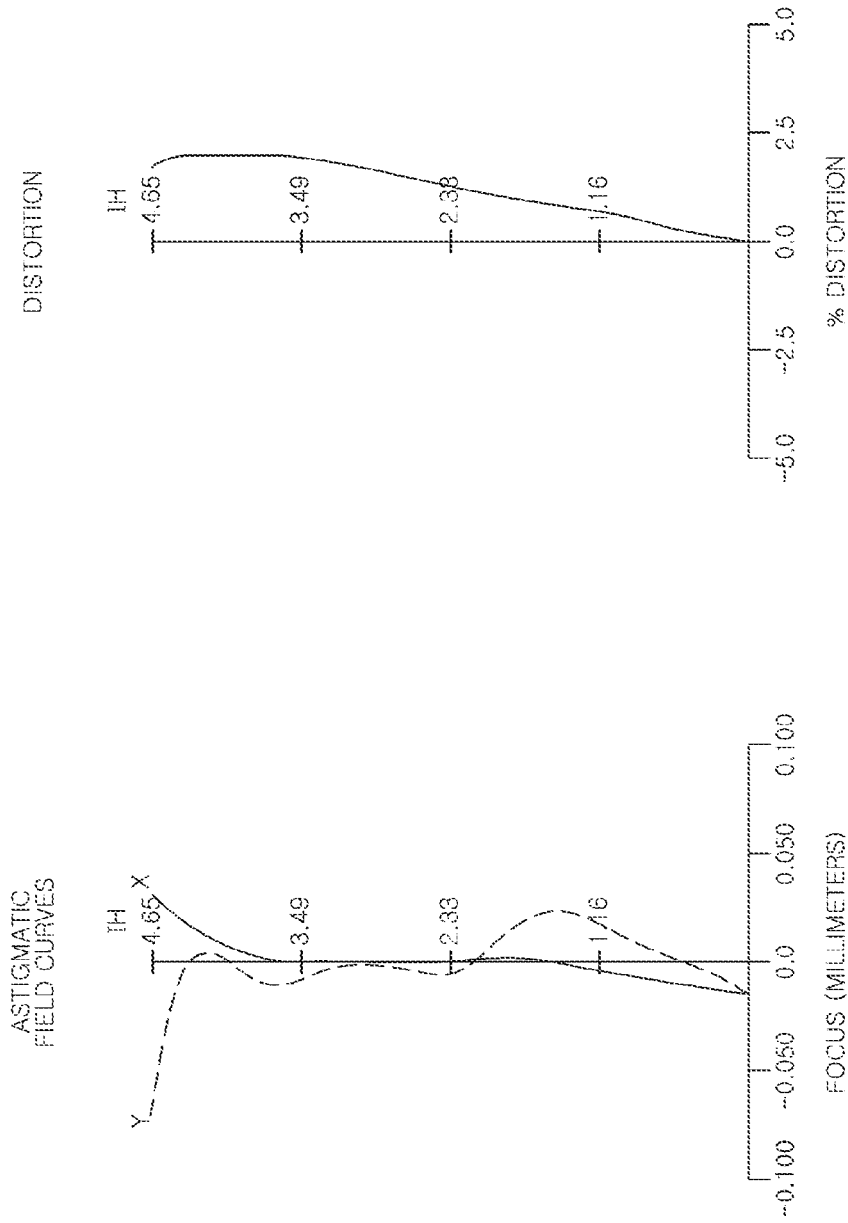
FIG. 2 illustrates aberration curves of the imaging lens system illustrated in FIG. 1.

The imaging lens system 100, configured as described above, illustrates aberration characteristics as shown in FIG. 2. Tables 1 and 2 illustrate lens characteristics and aspherical surface values of the imaging lens system 100.

TABLE 1

| Surface number | Reference | Radius of curvature | Thickness/ distance | Refractive index | Abbe number |
|---|---|---|---|---|---|
| S1 | First lens | 2.31 | 0.912 | 1.544 | 56.1 |
| S2 | | 10.53 | 0.164 | | |
| S3 | Second lens | 6.94 | 0.234 | 1.671 | 19.3 |
| S4 | | 3.85 | 0.422 | | |
| S5 | Third lens | 29.14 | 0.398 | 1.544 | 56.1 |
| S6 | | −24.16 | 0.264 | | |
| S7 | Fourth lens | −15.48 | 0.384 | 1.661 | 20.4 |
| S8 | | 60.01 | 0.421 | | |
| S9 | Fifth lens | 6.03 | 0.391 | 1.568 | 37.4 |
| S10 | | 5.66 | 0.341 | | |
| S11 | Sixth lens | 3.16 | 0.721 | 1.544 | 56.1 |
| S12 | | −6.06 | 0.608 | | |
| S13 | Seventh lens | −4.75 | 0.400 | 1.544 | 56.1 |
| S14 | | 2.67 | 0.305 | | |
| S15 | Filter | Infinity | 0.210 | 1.514 | 64.1 |
| S16 | | Infinity | 0.505 | | |
| Imaging Plane | Imaging Plane | Infinity | 0.015 | | |

TABLE 2

| Ex. 1 | K | A | B | C | D | E | F | G | H | J |
|---|---|---|---|---|---|---|---|---|---|---|
| S1 | −1.0366 | 0.0116 | −0.0008 | 0.0048 | −0.0062 | 0.0047 | −0.0020 | 0.0005 | −4.53E−05 | 0 |
| S2 | 23.6958 | −0.0234 | 0.0212 | −0.0193 | 0.0153 | −0.0096 | 0.0038 | −0.0008 | 0.0001 | 0 |
| S3 | 14.9297 | −0.0630 | 0.0570 | −0.0346 | 0.0148 | −0.0034 | −0.0002 | 0.0004 | −0.0001 | 0 |
| S4 | 0.1548 | −0.0490 | 0.0678 | −0.0816 | 0.1019 | −0.0934 | 0.0551 | −0.0183 | 0.0027 | 0 |
| S5 | 0 | −0.0423 | 0.0589 | −0.1884 | 0.3228 | −0.3302 | 0.1974 | −0.0637 | 0.0086 | 0 |
| S6 | 1.2398 | −0.0405 | 0.0131 | −0.0336 | 0.0382 | −0.0292 | 0.0134 | −0.0031 | 0.0003 | 0 |
| S7 | 0.00E+00 | −0.0791 | 0.0820 | −0.1699 | 0.2105 | −0.1653 | 0.0785 | −0.0206 | 0.0023 | 0 |
| S8 | 0.00E+00 | −0.0733 | 0.0632 | −0.0860 | 0.0773 | −0.0452 | 0.0163 | −0.0033 | 0.0003 | 0 |
| S9 | 0.00E+00 | −0.1024 | 0.0794 | −0.0551 | 0.0259 | −0.0082 | 0.0017 | −0.0002 | 1.10E−05 | 0 |
| S10 | −64.3279 | −0.1135 | 0.0639 | −0.0370 | 0.0160 | −0.0045 | 0.0008 | −0.0001 | 3.26E−06 | 0 |
| S11 | −6.4594 | −0.0209 | 0.0062 | −0.0036 | 0.0001 | 0.0002 | −4.09E−05 | 3.12E−06 | −8.70E−08 | 0 |
| S12 | −96.2611 | 0.0152 | 0.0068 | −0.0073 | 0.0021 | −0.0003 | 2.36E−05 | −9.62E−07 | 1.55E−08 | 0 |
| S13 | −8.2127 | −0.0827 | 0.0327 | −0.0059 | 0.0006 | −3.90E−05 | 1.43E−06 | −2.71E−08 | 1.86E−10 | 0 |
| S14 | −13.2198 | −0.0455 | 0.0159 | −0.0036 | 0.0005 | −4.84E−05 | 2.91E−06 | −1.07E−07 | 2.19E−09 | 0 |

Figure 3:
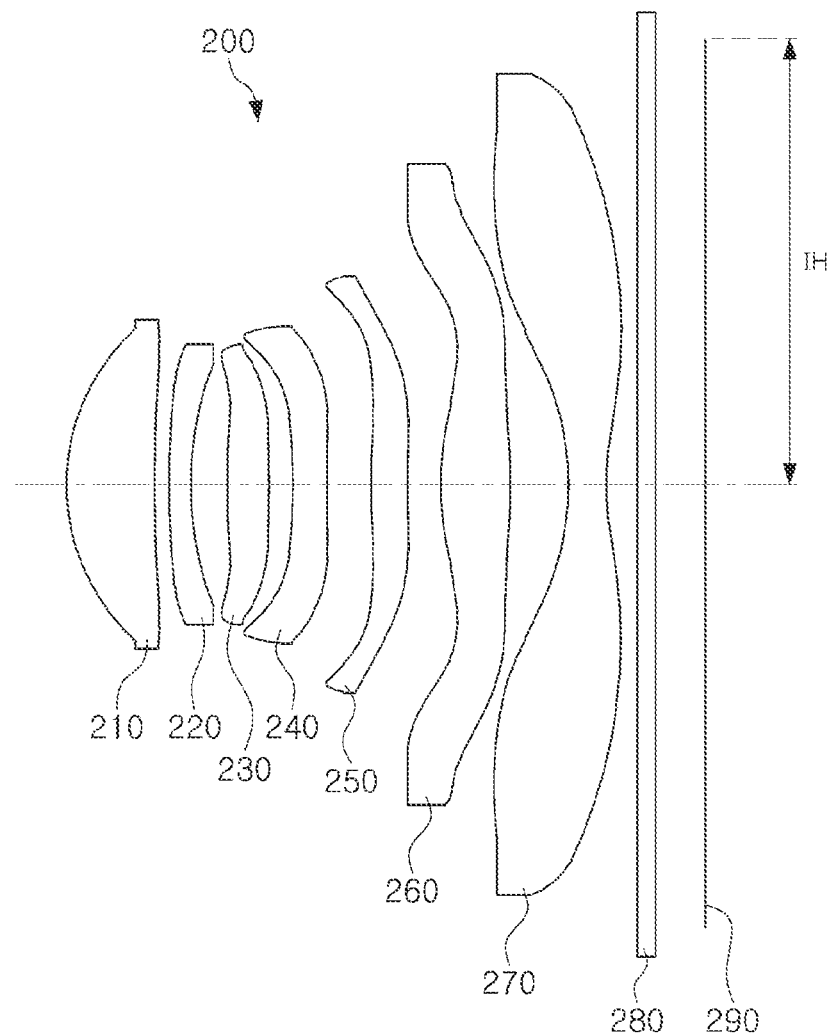
FIG. 3 is a configuration diagram of an imaging lens system according to a second example.

An imaging lens system according to a second example will be described with reference to FIG. 3.

An imaging lens system 200 includes a first lens 210, a second lens 220, a third lens 230, a fourth lens 240, a fifth lens 250, a sixth lens 260, and a seventh lens 270.

The first lens 210 has positive refractive power, and the first lens 210 has a convex shape on an object side surface and a concave shape on an image side surface. The second lens 220 has negative refractive power, and the second lens 220 has a convex shape on an object side surface and a concave shape on an image side surface. The third lens 230 has positive refractive power, and the third lens 230 has a convex shape on an object side surface and a convex shape on an image side surface. The fourth lens 240 has negative refractive power, and the fourth lens 240 has a concave shape on an object side surface and a concave shape on an image side surface. The fifth lens 250 has negative refractive power, and the fifth lens 250 has a convex shape on an object side surface and a concave shape on an image side surface. Further, the fifth lens 250 has a shape in which an inflection point is formed on the object side surface and the image side surface. The sixth lens 260 has positive refractive power, and the sixth lens 260 has a convex shape on an object side surface and a convex shape on an image side surface. Further, the sixth lens 260 has a shape in which an inflection point is formed on the object side surface and the image side surface. The seventh lens 270 has negative refractive power, and the seventh lens 270 has a concave shape on an object side surface and a concave shape on an image side surface. Further, the seventh lens 270 has a shape in which an inflection point is formed on the object side surface and the image side surface.

The imaging lens system 200 further includes a filter 280 and an image sensor 290. The filter 280 is disposed between the seventh lens 270 and the image sensor 290. For reference, although not shown in the drawings, a stop may be disposed between the second lens 220 and the third lens 230.

Figure 4:
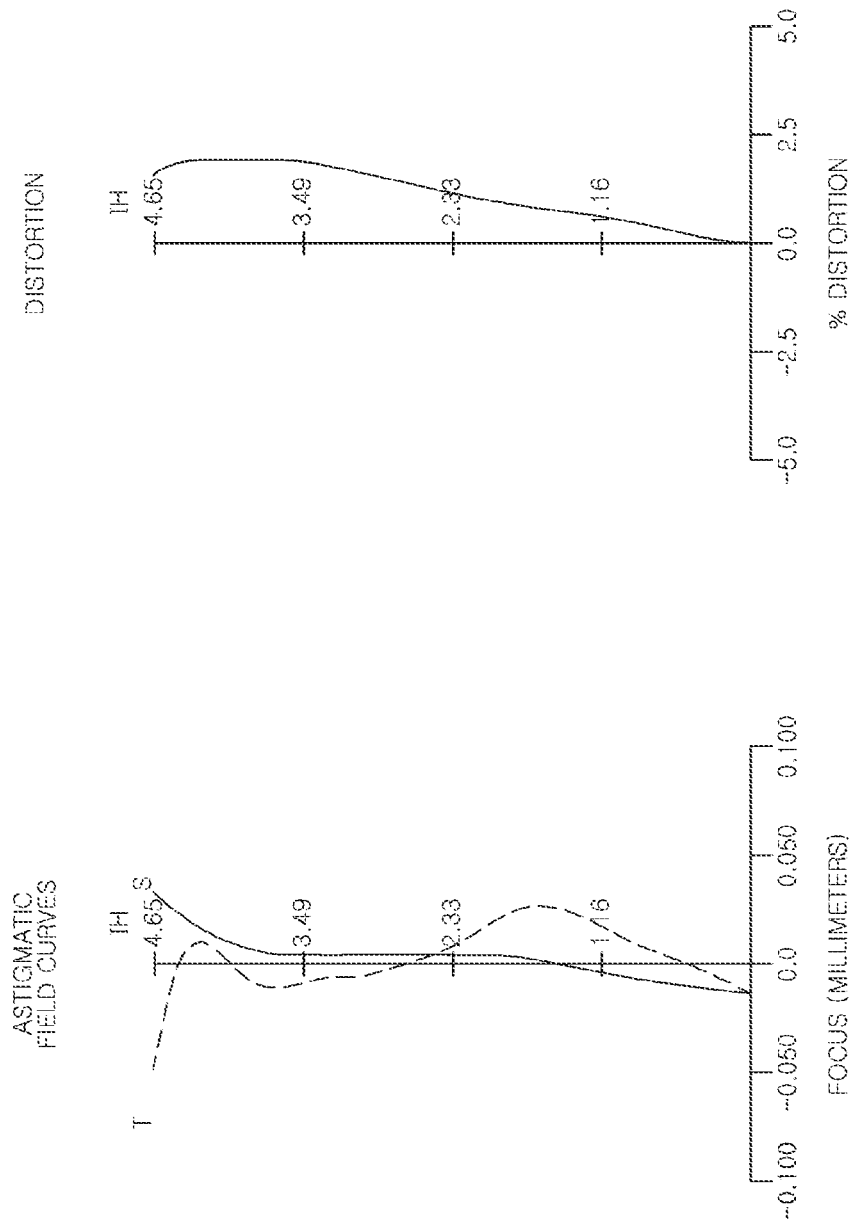
FIG. 4 illustrates aberration curves of the imaging lens system illustrated in FIG. 3.

The imaging lens system 200 illustrates aberration characteristics as shown in FIG. 4. Tables 3 and 4 illustrate lens characteristics and aspherical surface values of the imaging lens system 200.

TABLE 3

| Surface number | Reference | Radius of curvature | Thickness/ distance | Refractive index | Abbe number |
|---|---|---|---|---|---|
| S1 | First lens | 2.31 | 0.902 | 1.544 | 56.1 |
| S2 | | 10.41 | 0.165 | | |
| S3 | Second lens | 6.90 | 0.230 | 1.671 | 19.3 |
| S4 | | 3.85 | 0.425 | | |
| S5 | Third lens | 29.98 | 0.400 | 1.544 | 56.1 |
| S6 | | −22.77 | 0.254 | | |
| S7 | Fourth lens | −14.79 | 0.381 | 1.661 | 20.4 |
| S8 | | 76.35 | 0.433 | | |
| S9 | Fifth lens | 5.97 | 0.385 | 1.568 | 37.4 |
| S10 | | 5.62 | 0.350 | | |
| S11 | Sixth lens | 3.16 | 0.724 | 1.544 | 56.1 |
| S12 | | −6.24 | 0.611 | | |
| S13 | Seventh lens | −4.77 | 0.404 | 1.544 | 56.1 |
| S14 | | 2.67 | 0.305 | | |
| S15 | Filter | Infinity | 0.210 | 1.514 | 64.1 |
| S16 | | Infinity | 0.506 | | |
| Imaging plane | Imaging plane | Infinity | 0.015 | | |

TABLE 4

| Ex. 2 | K | A | B | C | D | E | F | G | H | J |
|---|---|---|---|---|---|---|---|---|---|---|
| S1 | −1.0458 | 0.0110 | 0.0016 | 0.0001 | −0.0010 | 0.0013 | −0.0008 | 0.0002 | −2.34E−05 | −1.89E−11 |
| S2 | 23.3325 | −0.0237 | 0.0220 | −0.0210 | 0.0169 | −0.0102 | 0.0039 | −0.0008 | 0.0001 | −1.89E−11 |
| S3 | 14.9068 | −0.0626 | 0.0550 | −0.0321 | 0.0139 | −0.0039 | 0.0005 | 0.0001 | −4.75E−05 | −1.89E−11 |
| S4 | 0.1571 | −0.0490 | 0.0681 | −0.0849 | 0.1100 | −0.1027 | 0.0608 | −0.0201 | 0.0029 | −1.89E−11 |
| S5 | 0 | −0.0435 | 0.0688 | −0.2161 | 0.3638 | −0.3653 | 0.2149 | −0.0683 | 0.0091 | −1.89E−11 |
| S6 | 13.4162 | −0.0370 | 0.0024 | −0.0147 | 0.0143 | −0.0093 | 0.0034 | −0.0004 | −4.30E−05 | −1.89E−11 |
| S7 | 0 | −0.0731 | 0.0587 | −0.1264 | 0.1595 | −0.1292 | 0.0637 | −0.0174 | 0.0020 | −1.89E−11 |
| S8 | 0 | −0.0725 | 0.0621 | −0.0871 | 0.0798 | −0.0473 | 0.0173 | −0.0035 | 0.0003 | −1.89E−11 |
| S9 | 0 | −0.1048 | 0.0841 | −0.0600 | 0.0290 | −0.0096 | 0.0021 | −0.0003 | 1.49E−05 | −1.89E−11 |
| S10 | −63.2478 | −0.1133 | 0.0633 | −0.0349 | 0.0141 | −0.0038 | 0.0006 | −0.0001 | 2.56E−06 | −1.89E−11 |
| S11 | −6.5212 | −0.0205 | 0.0060 | −0.0035 | 0.0001 | 0.0002 | −3.94E−05 | 2.98E−06 | −8.24E−08 | −1.89E−11 |
| S12 | −98.4791 | 0.0159 | 0.0055 | −0.0065 | 0.0019 | −0.0003 | 2.00E−05 | −7.81E−07 | 1.18E−08 | −1.89E−11 |
| S13 | −7.8013 | −0.0814 | 0.0318 | −0.0057 | 0.0006 | −3.69E−05 | 1.34E−06 | −2.46E−08 | 1.48E−10 | −1.89E−11 |
| S14 | −13.1752 | −0.0450 | 0.0157 | −0.0036 | 0.0005 | −0.0001 | 3.37E−06 | −1.37E−07 | 3.16E−09 | −3.20E−11 |

Figure 5:
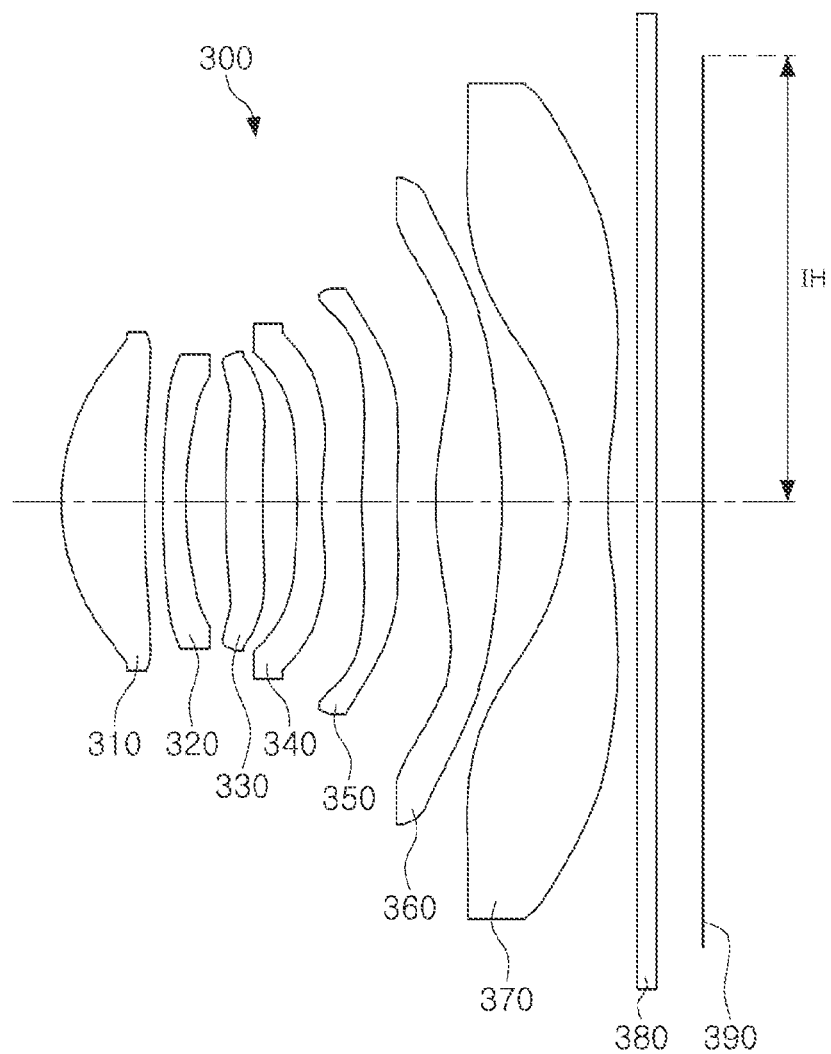
FIG. 5 is a configuration diagram of an imaging lens system according to a third example.

An imaging lens system according to a third example will be described with reference to FIG. 5.

An imaging lens system 300 includes a first lens 310, a second lens 320, a third lens 330, a fourth lens 340, a fifth lens 350, a sixth lens 360, and a seventh lens 370.

The first lens 310 has positive refractive power, and the first lens 310 has a convex shape on an object side surface and a concave shape on an image side surface. The second lens 320 has negative refractive power, and the second lens 320 has a convex shape on an object side surface and a concave shape on an image side surface. The third lens 330 has positive refractive power, and the third lens 330 has a convex shape on an object side surface and a concave shape on an image side surface. The fourth lens 340 has negative refractive power, and the fourth lens 340 has a concave shape on an object side surface and a concave shape on an image side surface. The fifth lens 350 has positive refractive power, and the fifth lens 350 has a convex shape on an object side surface and a concave shape on an image side surface. Further, the fifth lens 350 has a shape in which an inflection point is formed on the object side surface and the image side surface. The sixth lens 360 has positive refractive power, and the sixth lens 360 has a convex shape on an object side surface and a convex shape on an image side surface. Further, the sixth lens 360 has a shape in which an inflection point is formed on the object side surface and the image side surface. The seventh lens 370 has negative refractive power, and the seventh lens 370 has a concave shape on an object side surface and a concave shape on an image side surface. Further, the seventh lens 370 has a shape in which an inflection point is formed on the object side surface and the image side surface.

The imaging lens system 300 further includes a filter 380 and an image sensor 390. The filter 380 is disposed between the seventh lens 370 and the image sensor 390. For reference, although not shown in the drawings, a stop may be disposed between the second lens 320 and the third lens 330.

Figure 6:
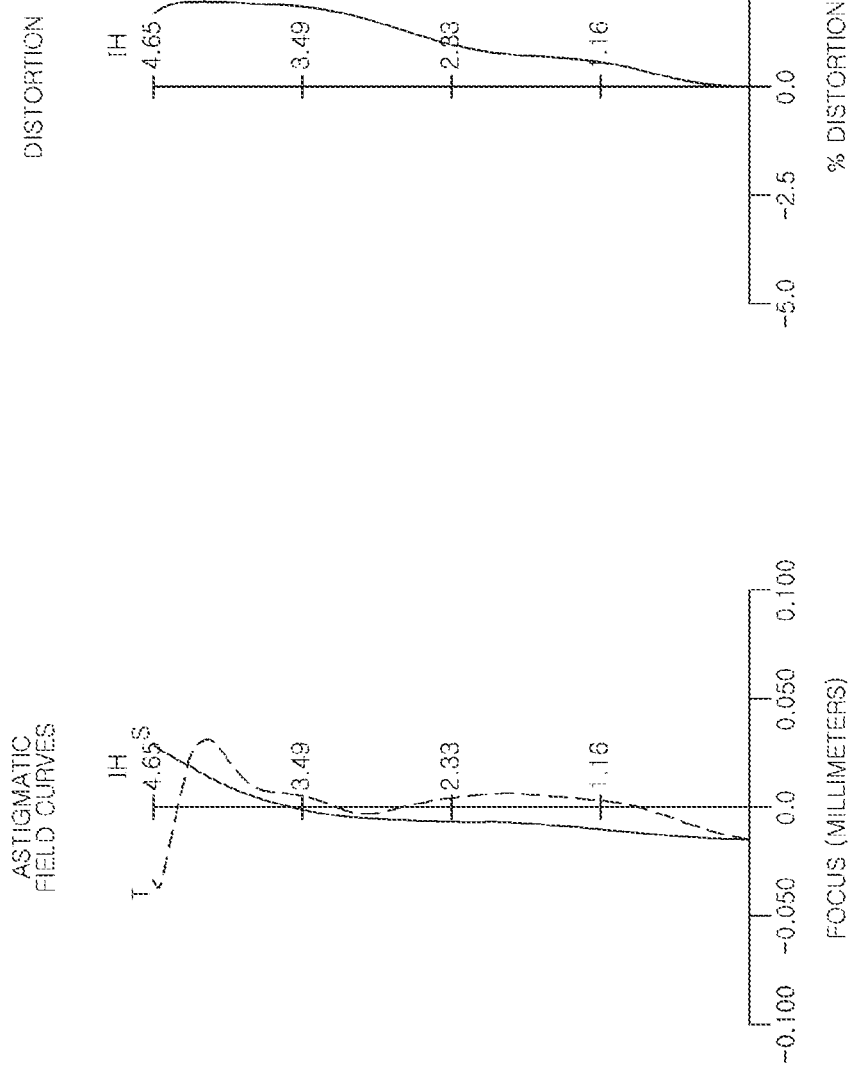
FIG. 6 illustrates aberration curves of the imaging lens system illustrated in FIG. 5.

The imaging lens system 300 illustrates aberration characteristics as shown in FIG. 6. Tables 5 and 6 illustrate lens characteristics and aspherical surface values of the imaging lens system 300.

TABLE 5

| Surface number | Reference | Radius of curvature | Thickness/ distance | Refractive index | Abbe number |
|---|---|---|---|---|---|
| S1 | First lens | 2.31 | 0.872 | 1.544 | 56.1 |
| S2 | | 9.70 | 0.188 | | |
| S3 | Second lens | 6.75 | 0.230 | 1.671 | 19.3 |
| S4 | | 3.80 | 0.489 | | |
| S5 | Third lens | 16.19 | 0.385 | 1.544 | 56.1 |
| S6 | | 167.06 | 0.300 | | |
| S7 | Fourth lens | −23.80 | 0.305 | 1.661 | 20.4 |
| S8 | | 40.38 | 0.366 | | |
| S9 | Fifth lens | 5.35 | 0.370 | 1.568 | 37.4 |
| S10 | | 5.32 | 0.395 | | |
| S11 | Sixth lens | 3.24 | 0.686 | 1.544 | 56.1 |
| S12 | | −6.56 | 0.717 | | |
| S13 | Seventh lens | −3.58 | 0.400 | 1.544 | 56.1 |
| S14 | | 3.42 | 0.305 | | |
| S15 | Filter | Infinity | 0.210 | 1.514 | 64.1 |
| S16 | | Infinity | 0.467 | | |
| Imaging plane | Imaging plane | Infinity | 0.015 | | |

TABLE 6

| Ex. 3 | K | A | B | C | D | E | F | G | H | J |
|---|---|---|---|---|---|---|---|---|---|---|
| S1 | −1.1399 | 0.0126 | −0.0026 | 0.0080 | −0.0100 | 0.0073 | −0.0031 | 0.0007 | −0.0001 | 0 |
| S2 | 17.5707 | −0.0266 | 0.0136 | −0.0013 | −0.0051 | 0.0039 | −0.0014 | 0.0002 | −1.65E−05 | 0 |
| S3 | 13.9756 | −0.0693 | 0.0468 | 0.0053 | −0.0362 | 0.0329 | −0.0152 | 0.0037 | −0.0004 | 0 |
| S4 | 0.8385 | −0.0479 | 0.0299 | 0.0494 | −0.1079 | 0.1034 | −0.0542 | 0.0149 | −0.0016 | 0 |
| S5 | 0 | −0.0461 | 0.0540 | −0.1587 | 0.2603 | −0.2573 | 0.1493 | −0.0469 | 0.0062 | 0 |
| S6 | −7.5340 | −0.0448 | 0.0274 | −0.0781 | 0.1061 | −0.0865 | 0.0412 | −0.0104 | 0.0011 | 0 |
| S7 | 0 | −0.0764 | 0.0778 | −0.1673 | 0.1988 | −0.1446 | 0.0632 | −0.0151 | 0.0015 | 0 |
| S8 | 0 | −0.0847 | 0.0920 | −0.1359 | 0.1217 | −0.0680 | 0.0232 | −0.0044 | 0.0004 | 0 |
| S9 | 0 | −0.1262 | 0.1233 | −0.0966 | 0.0501 | −0.0176 | 0.0040 | −0.0005 | 3.07E−05 | 0 |
| S10 | −54.7889 | −0.1208 | 0.0816 | −0.0462 | 0.0181 | −0.0049 | 0.0009 | −0.0001 | 4.45E−06 | 0 |
| S11 | −8.7794 | −0.0128 | −0.0022 | 0.0010 | −0.0010 | 0.0004 | −0.0001 | 4.45E−06 | −1.33E−07 | 0 |
| S12 | −40.2521 | 0.0295 | −0.0189 | 0.0049 | −0.0009 | 0.0002 | −1.76E−05 | 1.16E−06 | −3.12E−08 | 0 |

TABLE 6-continued

| Ex. 3 | K | A | B | C | D | E | F | G | H | J |
|---|---|---|---|---|---|---|---|---|---|---|
| S13 | −3.6141 | −0.0550 | 0.0087 | 0.0019 | −0.0007 | 0.0001 | −6.62E−06 | 2.36E−07 | −3.47E−09 | 0 |
| S14 | −15.7838 | −0.0378 | 0.0096 | −0.0013 | 0.0001 | −1.72E−06 | −1.76E−07 | 1.40E−08 | −4.05E−10 | 4.26E−12 |

Figure 7:
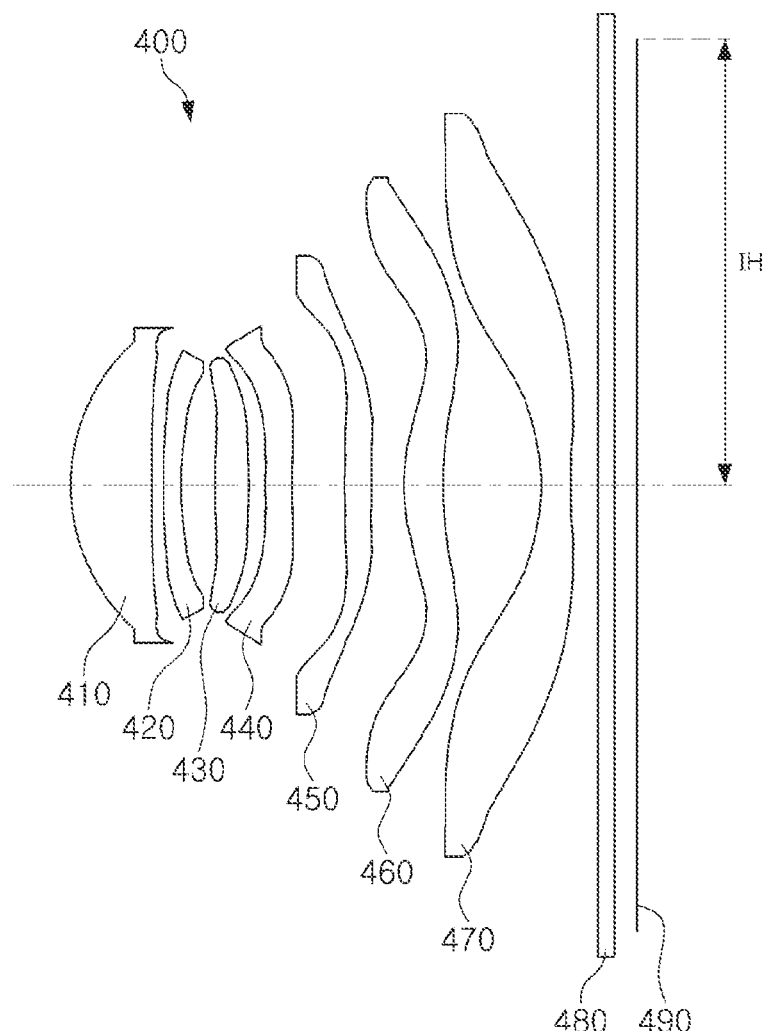
FIG. 7 is a configuration diagram of an imaging lens system according to a fourth example.

An imaging lens system according to a fourth example will be described with reference to FIG. 7.

An imaging lens system 400 includes a first lens 410, a second lens 420, a third lens 430, a fourth lens 440, a fifth lens 450, a sixth lens 460, and a seventh lens 470.

The first lens 410 has positive refractive power, and the first lens 410 has a convex shape on an object side surface and a concave shape on an image side surface. The second lens 420 has negative refractive power, and the second lens 420 has a convex shape on an object side surface and a concave shape on an image side surface. The third lens 430 has positive refractive power, and the third lens 430 has a convex shape on an object side surface and a concave shape on an image side surface. The fourth lens 440 has negative refractive power, and the fourth lens 440 has a concave shape on an object side surface and a concave shape on an image side surface. The fifth lens 450 has negative refractive power, and the fifth lens 450 has a convex shape on an object side surface and a concave shape on an image side surface. Further, the fifth lens 450 has a shape in which an inflection point is formed on the object side surface and the image side surface. The sixth lens 460 has positive refractive power, and the sixth lens 460 has a convex shape on an object side surface and a concave shape on an image side surface. Further, the sixth lens 460 has a shape in which an inflection point is formed on the object side surface and the image side surface. The seventh lens 470 has negative refractive power, and the seventh lens 470 has a concave shape on an object side surface and a concave shape on an image side surface. Further, the seventh lens 470 has a shape in which an inflection point is formed on the object side surface and the image side surface.

The imaging lens system 400 further includes a filter 480 and an image sensor 490. The filter 480 is disposed between the seventh lens 470 and the image sensor 490. For reference, although not shown in the drawings, a stop may be disposed between the second lens 420 and the third lens 430.

Figure 8:
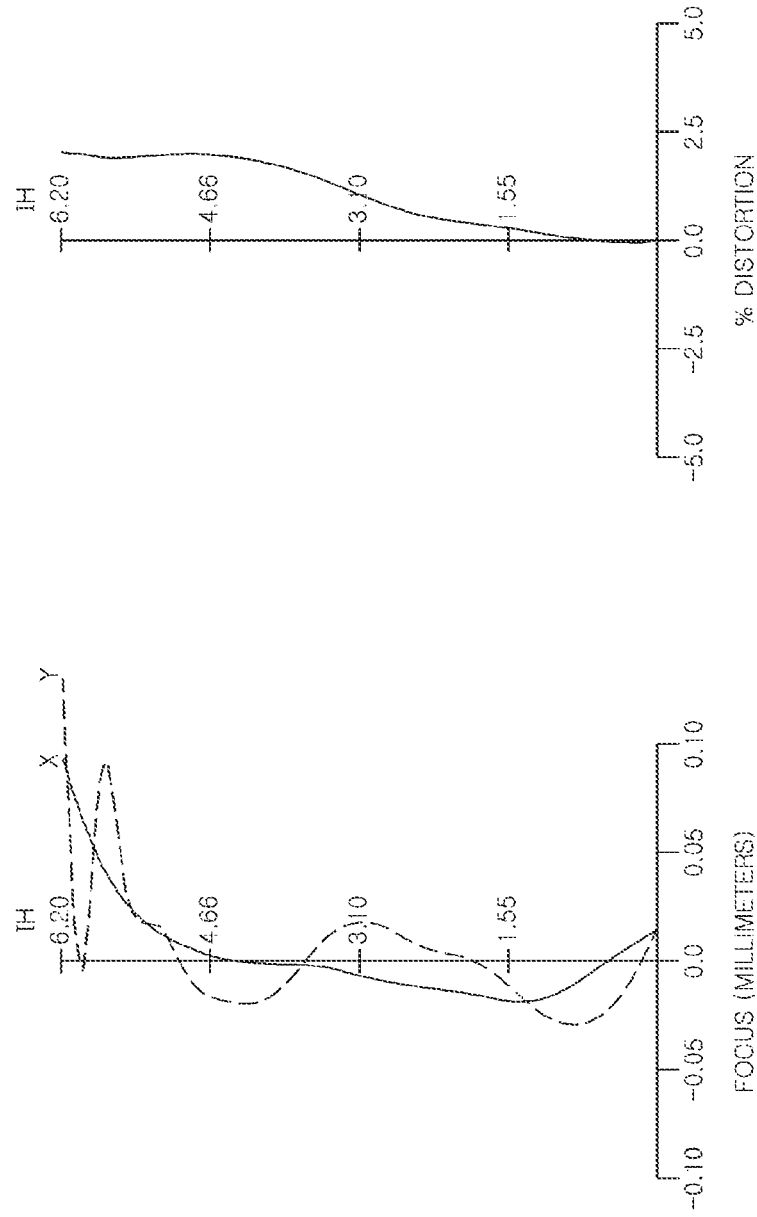
FIG. 8 illustrates aberration curves of the imaging lens system illustrated in FIG. 7.

The imaging lens system 400 illustrates aberration characteristics as shown in FIG. 8. Tables 7 and 8 illustrate lens characteristics and aspherical surface values of the imaging lens system 400.

TABLE 7

| Surface number | Reference | Radius of curvature | Thickness/distance | Refractive index | Abbe number |
|---|---|---|---|---|---|
| S1 | First lens | 2.723 | 1.100 | 1.544 | 56.1 |
| S2 |  | 12.203 | 0.181 |  |  |
| S3 | Second lens | 8.384 | 0.230 | 1.671 | 19.3 |
| S4 |  | 4.498 | 0.529 |  |  |
| S5 | Third lens | 83.525 | 0.424 | 1.544 | 56.1 |
| S6 |  | −31.911 | 0.232 |  |  |
| S7 | Fourth lens | −40.873 | 0.408 | 1.661 | 20.4 |
| S8 |  | 497.247 | 0.678 |  |  |
| S9 | Fifth lens | 6.912 | 0.373 | 1.568 | 37.4 |
| S10 |  | 5.807 | 0.443 |  |  |
| S11 | Sixth lens | 2.544 | 0.541 | 1.544 | 56.1 |
| S12 |  | 6.584 | 1.354 |  |  |
| S13 | Seventh lens | −4.071 | 0.420 | 1.544 | 56.1 |
| S14 |  | 7.701 | 0.377 |  |  |
| S15 | Filter | Infinity | 0.210 | 1.514 | 64.2 |
| S16 |  | Infinity | 0.345 |  |  |
| Imaging plane | Imaging plane | Infinity | −0.015 |  |  |

TABLE 8

| Ex. 4 | K | A | B | C | D | E | F | G | H | J |
|---|---|---|---|---|---|---|---|---|---|---|
| S1 | −1.0394 | 0.0040 | 0.0069 | −0.0084 | 0.0069 | −0.0036 | 0.0012 | −0.0003 | 3.23E−05 | −1.74E−06 |
| S2 | 21.6009 | −0.0171 | 0.0046 | 0.0082 | −0.0127 | 0.0089 | −0.0037 | 0.0009 | −0.0001 | 7.09E−06 |
| S3 | 15.9987 | −0.0525 | 0.0325 | 0.0037 | −0.0232 | 0.0211 | −0.0103 | 0.0030 | −0.0005 | 3.06E−05 |
| S4 | 1.0581 | −0.0412 | 0.0340 | −0.0111 | 0.0039 | −0.0057 | 0.0059 | −0.0029 | 0.0007 | −0.0001 |
| S5 | 0 | −0.0210 | −0.0180 | 0.0475 | −0.0705 | 0.0651 | −0.0374 | 0.0129 | −0.0025 | 0.0002 |
| S6 | −76.4723 | −0.0373 | 0.0235 | −0.0503 | 0.0666 | −0.0527 | 0.0260 | −0.0079 | 0.0013 | −0.0001 |
| S7 | 0 | −0.0410 | 0.0064 | −0.0081 | 0.0068 | −0.0022 | −0.0003 | 0.0004 | −0.0001 | 1.26E−05 |
| S8 | 0 | −0.0354 | 0.0130 | −0.0145 | 0.0106 | −0.0045 | 0.0011 | −0.0001 | −7.15E−06 | 1.59E−06 |
| S9 | 0 | −0.0625 | 0.0399 | −0.0218 | 0.0081 | −0.0022 | 0.0004 | −0.0001 | 0.0000 | −1.37E−07 |
| S10 | −99.0000 | −0.0603 | 0.0241 | −0.0076 | 0.0016 | −0.0002 | 2.98E−05 | −3.23E−06 | 2.10E−07 | −5.68E−09 |
| S11 | −7.2394 | 0.0102 | −0.0102 | 0.0021 | −0.0004 | 0.0001 | −5.72E−06 | 3.13E−07 | −9.05E−09 | 1.08E−10 |
| S12 | −27.2182 | 0.0362 | −0.0182 | 0.0039 | −0.0006 | 0.0001 | −4.38E−06 | 2.05E−07 | −5.44E−09 | 6.16E−11 |
| S13 | −4.2405 | −0.0338 | 0.0065 | −0.0004 | 1.56E−06 | 1.38E−06 | −8.01E−08 | 1.82E−09 | −1.07E−11 | −1.27E−13 |
| S14 | −54.8281 | −0.0218 | 0.0032 | −0.0003 | 1.25E−05 | −3.05E−07 | 1.15E−08 | −8.25E−10 | 2.96E−11 | −3.74E−13 |

Figure 9:
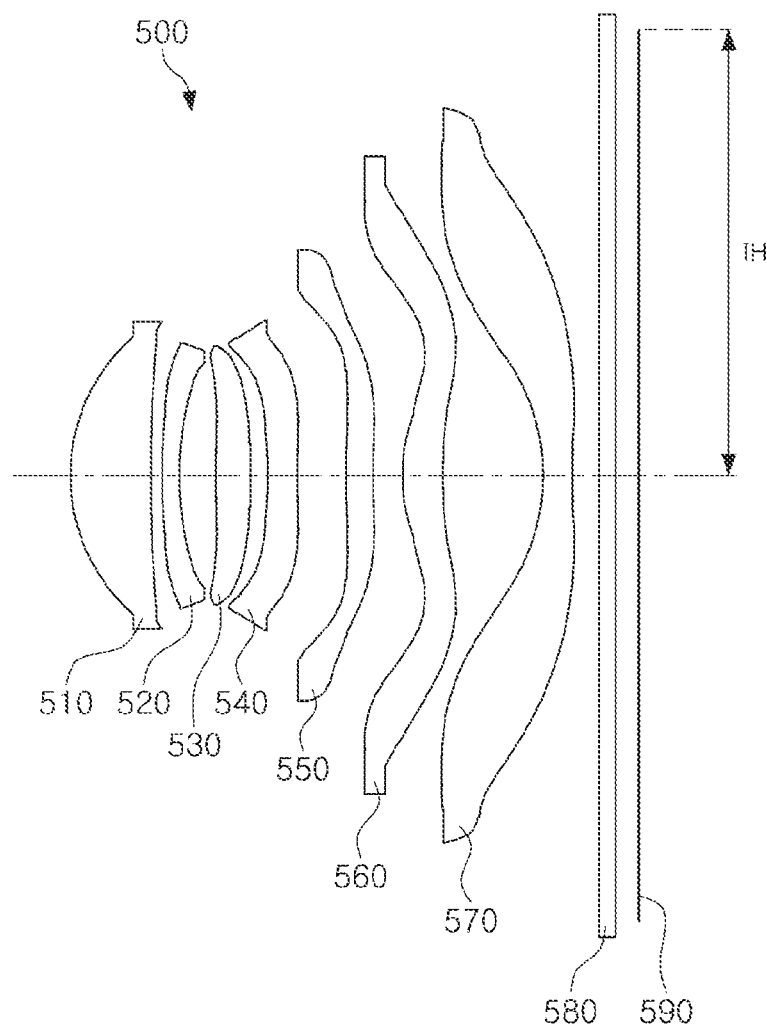
FIG. 9 is a configuration diagram of an imaging lens system according to a fifth example.

An imaging lens system according to a fifth example will be described with reference to FIG. 9.

An imaging lens system 500 includes a first lens 510, a second lens 520, a third lens 530, a fourth lens 540, a fifth lens 550, a sixth lens 560, and a seventh lens 570.

The first lens 510 has positive refractive power, and the first lens 510 has a convex shape on an object side surface and a concave shape on an image side surface. The second lens 520 has negative refractive power, and the second lens 520 has a convex shape on an object side surface and a concave shape on an image side surface. The third lens 530 has positive refractive power, and the third lens 530 has a convex shape on an object side surface and a convex shape on an image side surface. The fourth lens 540 has negative refractive power, and the fourth lens 540 has a concave shape on an object side surface and a concave shape on an image side surface. The fifth lens 550 has negative refractive power, and the fifth lens 550 has a convex shape on an object side surface and a concave shape on an image side surface. Further, the fifth lens 550 has a shape in which an inflection point is formed on the object side surface and the image side surface. The sixth lens 560 has positive refractive power, and the sixth lens 560 has a convex shape on an object side surface and a concave shape on an image side surface.

Further, the sixth lens 560 has a shape in which an inflection point is formed on the object side surface and the image side surface. The seventh lens 570 has negative refractive power, and the seventh lens 570 has a concave shape on an object side surface and a concave shape on an image side surface. Further, the seventh lens 570 has a shape in which an inflection point is formed on the object side surface and the image side surface.

The imaging lens system 500 further includes a filter 580 and an image sensor 590. The filter 580 is disposed between the seventh lens 570 and the image sensor 590. For reference, although not shown in the drawings, a stop may be disposed between the second lens 520 and the third lens 530.

Figure 10:
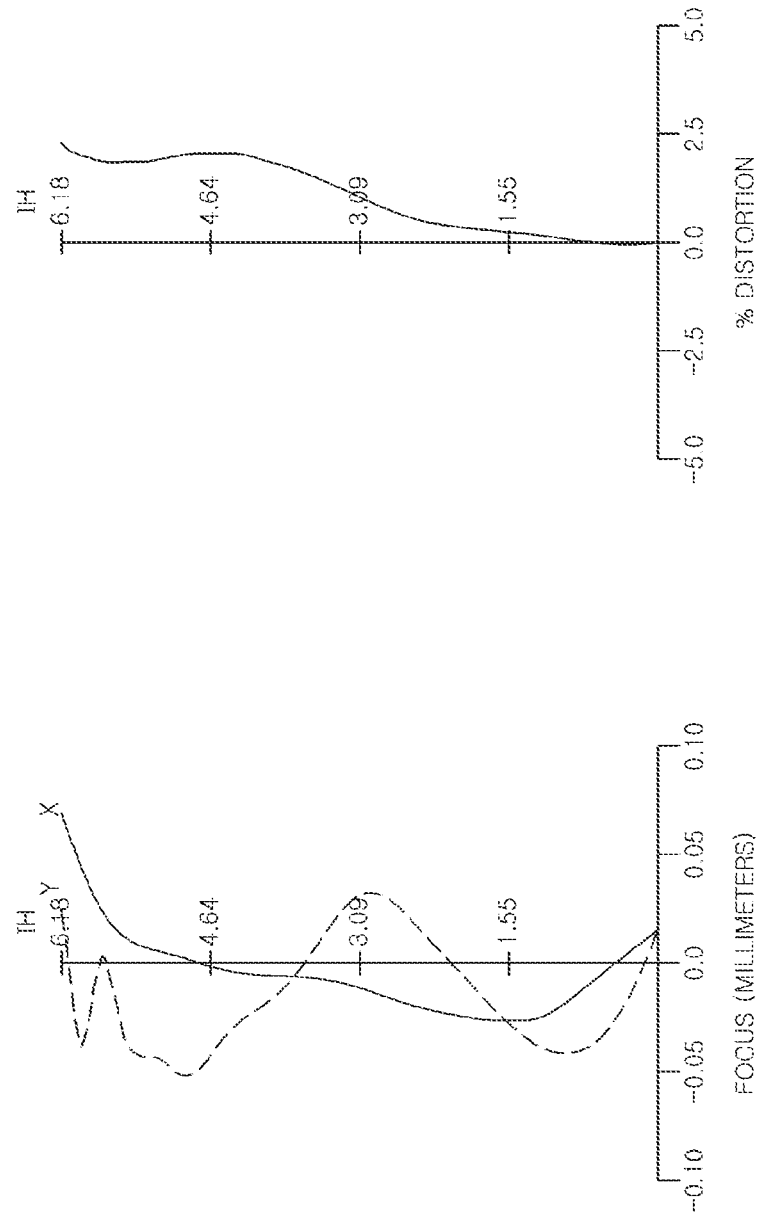
FIG. 10 illustrates aberration curves of the imaging lens system illustrated in FIG. 9.

The imaging lens system 500 illustrates an aberration characteristic as shown in FIG. 10. Tables 9 and 10 illustrate lens characteristics and aspherical surface values of the imaging lens system 500.

TABLE 9

| Surface number | Reference | Radius of curvature | Thickness/distance | Refractive index | Abbe number |
|---|---|---|---|---|---|
| S1 | First lens | 2.7185076 | 1.092 | 1.544 | 56.1 |
| S2 | | 12.76 | 0.175 | | |
| S3 | Second lens | 8.66 | 0.230 | 1.671 | 19.3 |
| S4 | | 4.58 | 0.542 | | |
| S5 | Third lens | 58.30 | 0.437 | 1.544 | 56.1 |
| S6 | | −37.343513 | 0.233 | | |
| S7 | Fourth lens | −39.38 | 0.455 | 1.639 | 23.5 |
| S8 | | 197.62 | 0.629 | | |
| S9 | Fifth lens | 6.51 | 0.370 | 1.568 | 37.4 |
| S10 | | 4.86 | 0.417 | | |
| S11 | Sixth lens | 2.50 | 0.544 | 1.544 | 56.1 |
| S12 | | 7.54 | 1.368 | | |
| S13 | Seventh lens | −4.08 | 0.420 | 1.544 | 56.1 |
| S14 | | 7.41 | 0.377 | | |
| S15 | Filter | Infinity | 0.210 | 1.514 | 64.2 |
| S16 | | Infinity | 0.347 | | |
| Imaging plane | Imaging plane | Infinity | −0.015 | | |

TABLE 10

| Ex. 5 | K | A | B | C | D | E | F | G | H | J |
|---|---|---|---|---|---|---|---|---|---|---|
| S1 | −1.0355 | 0.0008 | 0.0147 | −0.0193 | 0.0161 | −0.0085 | 0.0029 | −0.0006 | 0.0001 | −3.66E−06 |
| S2 | 23.2430 | −0.0191 | 0.0100 | 0.0009 | −0.0062 | 0.0051 | −0.0023 | 0.0006 | −0.0001 | 4.77E−06 |
| S3 | 16.0208 | −0.0571 | 0.0446 | −0.0141 | −0.0065 | 0.0106 | −0.0060 | 0.0018 | −0.0003 | 2.02E−05 |
| S4 | 0.9155 | −0.0438 | 0.0385 | −0.0132 | −0.0020 | 0.0049 | −0.0023 | 0.0005 | −1.72E−05 | −4.19E−06 |
| S5 | 0 | −0.0212 | −0.0159 | 0.0393 | −0.0520 | 0.0426 | −0.0217 | 0.0067 | −0.0011 | 0.0001 |
| S6 | −43.9004 | −0.0442 | 0.0384 | −0.0699 | 0.0811 | −0.0581 | 0.0263 | −0.0074 | 0.0012 | −0.0001 |
| S7 | 0 | −0.0412 | 0.0034 | 0.0035 | −0.0134 | 0.0170 | −0.0110 | 0.0039 | −0.0007 | 0.0001 |
| S8 | 0 | −0.0371 | 0.0171 | −0.0170 | 0.0098 | −0.0028 | 0.0001 | 0.0002 | −4.53E−05 | 3.78E−06 |
| S9 | 0 | −0.0761 | 0.0558 | −0.0344 | 0.0147 | −0.0045 | 0.0009 | −0.0001 | 9.80E−06 | −3.30E−07 |
| S10 | −75.9915 | −0.0668 | 0.0292 | −0.0101 | 0.0023 | −0.0004 | 0.0001 | −4.85E−06 | 2.85E−07 | −7.22E−09 |
| S11 | −8.2269 | 0.0131 | −0.0136 | 0.0036 | −0.0008 | 0.0001 | −1.04E−05 | 5.57E−07 | −1.59E−08 | 1.90E−10 |
| S12 | −38.3867 | 0.0373 | −0.0206 | 0.0051 | −0.0008 | 0.0001 | −7.88E−06 | 3.83E−07 | −1.03E−08 | 1.18E−10 |
| S13 | −3.1329 | −0.0341 | 0.0063 | −0.0004 | −7.92E−07 | 1.14E−06 | −4.71E−08 | 1.78E−10 | 2.87E−11 | −5.13E−13 |
| S14 | −42.1372 | −0.0248 | 0.0041 | −0.0004 | 2.77E−05 | −1.22E−06 | 3.46E−08 | −6.33E−10 | 9.25E−12 | −1.06E−13 |

Figure 11:
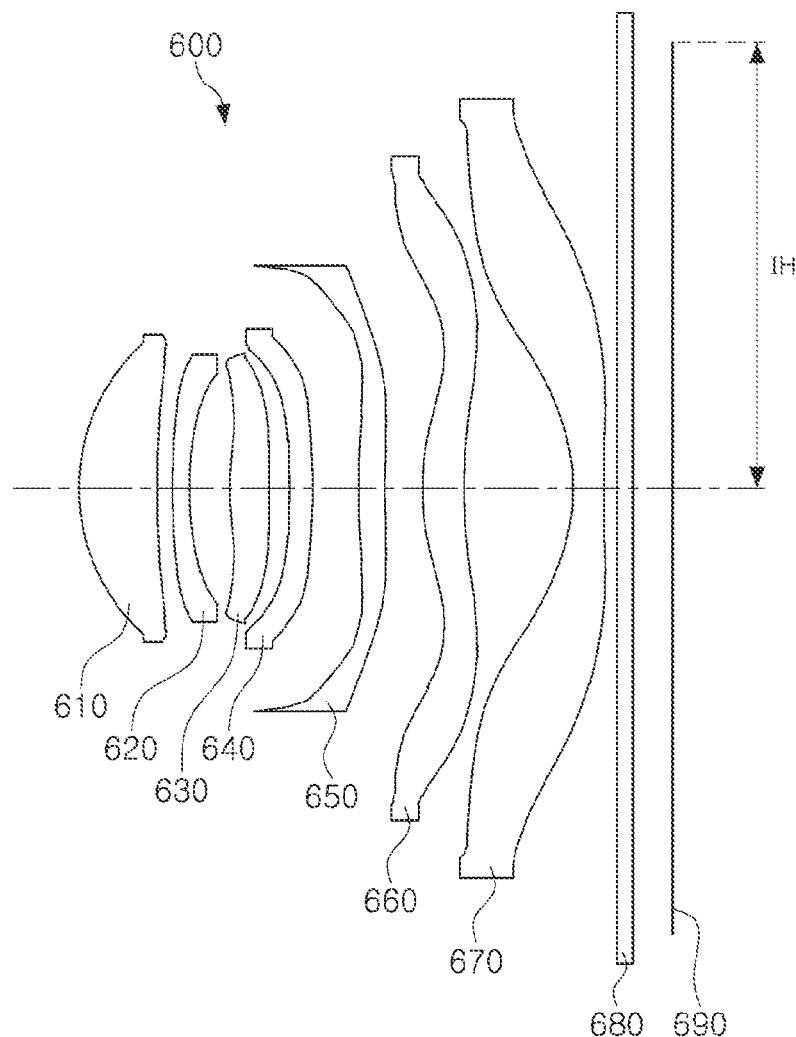
FIG. 11 is a configuration diagram of an imaging lens system according to a sixth example.

An imaging lens system according to a sixth example will be described with reference to FIG. 11.

An imaging lens system 600 includes a first lens 610, a second lens 620, a third lens 630, a fourth lens 640, a fifth lens 650, a sixth lens 660, and a seventh lens 670.

The first lens 610 has positive refractive power, and the first lens 610 has a convex shape on an object side surface and a concave shape on an image side surface. The second lens 620 has negative refractive power, and the second lens 620 has a convex shape on an object side surface and a concave shape on an image side surface. The third lens 630 has positive refractive power, and the third lens 630 has a convex shape on an object side surface and a convex shape on an image side surface. The fourth lens 640 has negative refractive power, and the fourth lens 640 has a concave shape on an object side surface and a convex shape on an image side surface. The fifth lens 650 has positive refractive power, and the fifth lens 650 has a convex shape on an object side surface and a concave shape on an image side surface. Further, the fifth lens 650 has a shape in which an inflection point is formed on the object side surface and the image side surface. The sixth lens 660 has positive refractive power, and the sixth lens 660 has a convex shape on an object side surface and a concave shape on an image side surface. Further, the sixth lens 660 has a shape in which an inflection point is formed on the object side surface and the image side surface. The seventh lens 670 has negative refractive power, and the seventh lens 670 has a concave shape on an object side surface and a concave shape on an image side surface. Further, the seventh lens 670 has a shape in which an inflection point is formed on the object side surface and the image side surface.

The imaging lens system 600 further includes a filter 680 and an image sensor 690. The filter 680 is disposed between the seventh lens 670 and the image sensor 690. For reference, although not shown in the drawings, a stop may be disposed between the second lens 620 and the third lens 630.

Figure 12:
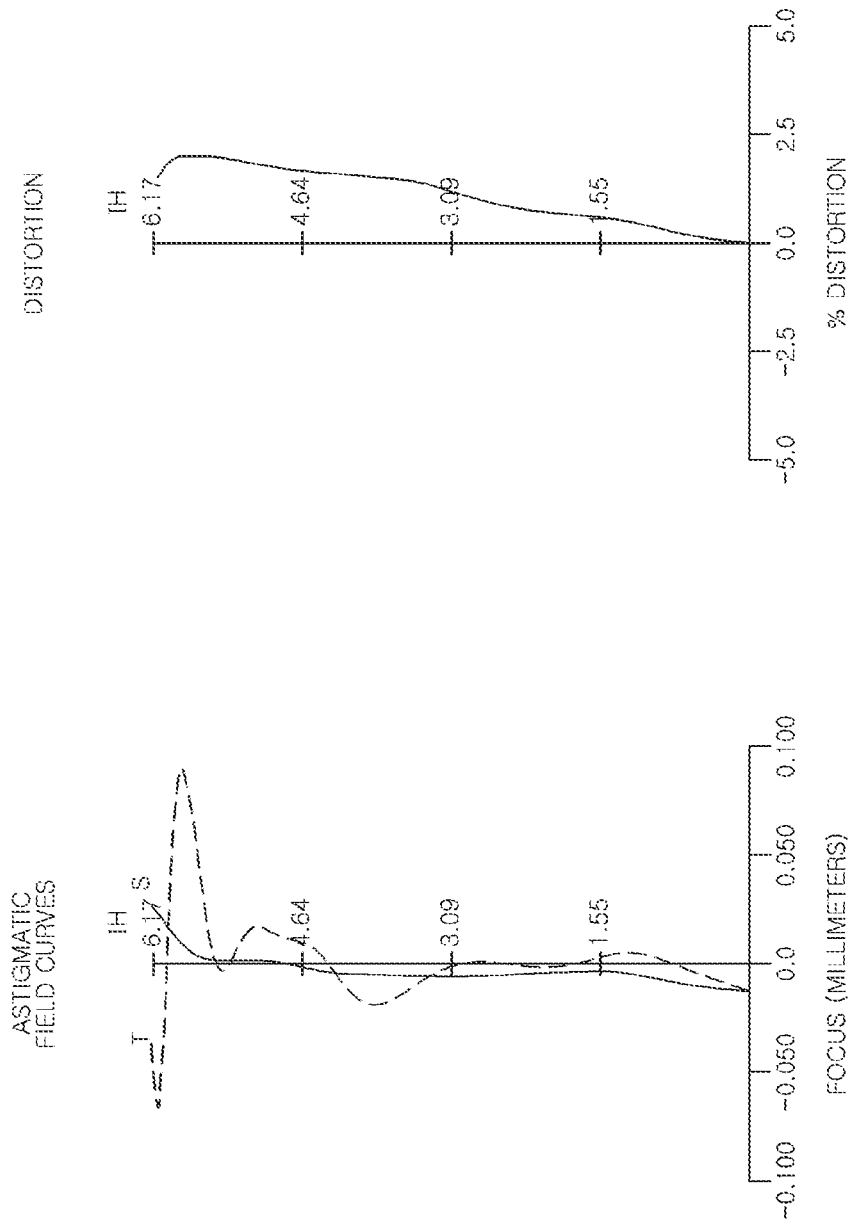
FIG. 12 illustrates aberration curves of the imaging lens system illustrated in FIG. 11.

The imaging lens system 600 illustrates aberration characteristics as shown in FIG. 12. Tables 11 and 12 illustrate lens characteristics and aspherical surface values of the imaging lens system 600.

TABLE 11

| Surface number | Reference | Radius of curvature | Thickness/distance | Refractive index | Abbe number |
|---|---|---|---|---|---|
| S1 | First lens | 2.67 | 1.031 | 1.544 | 56.1 |
| S2 |  | 9.43 | 0.200 |  |  |
| S3 | Second lens | 6.95 | 0.230 | 1.680 | 18.4 |
| S4 |  | 4.29 | 0.622 |  |  |
| S5 | Third lens | 59.38986 | 0.437 | 1.544 | 56.1 |
| S6 |  | −50.84 | 0.264 |  |  |
| S7 | Fourth lens | −23.50 | 0.326 | 1.680 | 18.4 |
| S8 |  | −61.66 | 0.571 |  |  |
| S9 | Fifth lens | 6.42 | 0.359 | 1.568 | 37.4 |
| S10 |  | 6.69 | 0.493 |  |  |
| S11 | Sixth lens | 3.06 | 0.552 | 1.544 | 56.1 |
| S12 |  | 9.80 | 1.430 |  |  |
| S13 | Seventh lens | −3.48 | 0.403 | 1.544 | 56.1 |
| S14 |  | 10.26 | 0.181 |  |  |
| S15 | Filter | Infinity | 0.210 | 1.514 | 64.2 |
| S16 |  | Infinity | 0.509 |  |  |
| Imaging plane | Imaging plane | Infinity | 0.012 |  |  |

TABLE 12

| Ex. 6 | K | A | B | C | D | E | F | G | H | J |
|---|---|---|---|---|---|---|---|---|---|---|
| S1 | −1.0111 | 0.0031 | 0.0115 | −0.0176 | 0.0170 | −0.0102 | 0.0038 | −0.0009 | 0.0001 | −6.32E−06 |
| S2 | 14.6338 | −0.0181 | 0.0087 | −0.0053 | 0.0039 | −0.0024 | 0.0010 | −0.0002 | 3.43E−05 | −2.02E−06 |
| S3 | 13.0489 | −0.0453 | 0.0301 | −0.0165 | 0.0139 | −0.0111 | 0.0059 | −0.0019 | 0.0003 | −2.53E−05 |
| S4 | 2.0700 | −0.0302 | 0.0190 | 0.0095 | −0.0239 | 0.0234 | −0.0137 | 0.0048 | −0.0010 | 0.0001 |
| S5 | 0 | −0.0158 | −0.0302 | 0.0716 | −0.1026 | 0.0914 | −0.0512 | 0.0176 | −0.0034 | 0.0003 |
| S6 | 94.2471 | −0.0214 | −0.0101 | 0.0093 | −0.0072 | 0.0054 | −0.0031 | 0.0011 | −0.0002 | 1.63E−05 |
| S7 | 0 | −0.0167 | −0.0437 | 0.0720 | −0.0791 | 0.0568 | −0.0259 | 0.0072 | −0.0011 | 0.0001 |
| S8 | 0 | −0.0186 | −0.0236 | 0.0334 | −0.0305 | 0.0182 | −0.0069 | 0.0016 | −0.0002 | 1.17E−05 |
| S9 | 0 | −0.0396 | 0.0203 | −0.0108 | 0.0041 | −0.0011 | 0.0002 | −2.52E−05 | 1.79E−06 | −5.46E−08 |
| S10 | −55.6301 | −0.0479 | 0.0210 | −0.0082 | 0.0024 | −0.0005 | 0.0001 | −7.14E−06 | 3.78E−07 | −8.43E−09 |
| S11 | −7.3401 | 0.0023 | −0.0046 | 0.0004 | 1.39E−06 | −2.88E−06 | 3.40E−07 | −2.51E−08 | 1.01E−09 | −1.63E−11 |
| S12 | −70.2827 | 0.0258 | −0.0110 | 0.0019 | −0.0002 | 1.02E−05 | −2.06E−07 | −1.08E−08 | 7.73E−10 | −1.41E−11 |
| S13 | −5.4006 | −0.0324 | 0.0065 | −0.0006 | 0.0001 | −6.11E−06 | 4.47E−07 | −1.95E−08 | 4.53E−10 | −4.35E−12 |
| S14 | −81.9062 | −0.0174 | 0.0025 | −0.0002 | 1.41E−05 | −1.05E−06 | 7.83E−08 | −3.60E−09 | 8.34E−11 | −7.60E−13 |

Table 13 illustrates characteristic values of the imaging lens system according to the first example to the sixth example.

TABLE 13

| Reference | First Example | Second Example | Third Example | Fourth Example | Fifth Example | Sixth Example |
|---|---|---|---|---|---|---|
| f | 5.4400 | 5.4400 | 5.5000 | 6.7900 | 6.7900 | 6.7700 |
| f1 | 5.2118 | 5.2360 | 5.3400 | 6.1671 | 6.0930 | 6.4870 |
| f2 | −13.136 | −13.269 | −13.240 | −14.973 | −14.655 | −16.875 |
| f3 | 24.259 | 23.771 | 32.805 | 42.349 | 41.763 | 50.247 |
| f4 | −18.415 | −18.540 | −22.408 | −56.614 | −50.900 | −55.460 |
| f5 | −264.430 | −276.040 | 469.354 | −72.648 | −36.671 | 189.158 |
| f6 | 3.9103 | 3.9450 | 4.0730 | 7.2520 | 6.5810 | 7.9250 |
| f7 | −3.0703 | −3.0755 | −3.1397 | −4.8170 | −4.7618 | −4.7070 |
| f12 | 7.4920 | 7.5199 | 7.7610 | 9.1670 | 4.8690 | 9.2468 |
| TTL | 6.6945 | 6.7000 | 6.7000 | 7.8300 | 7.8300 | 7.8298 |
| BFL | 1.0349 | 1.0360 | 0.9966 | 0.9175 | 0.9188 | 0.9120 |
| FOV | 80.0 | 80.0 | 80.0 | 82.0 | 82.0 | 82.0 |
| IH | 4.6500 | 4.6500 | 4.6500 | 6.0070 | 6.0070 | 6.0070 |
| SD5 | 2.2950 | 2.2961 | 2.2430 | 3.0737 | 3.0639 | 2.9890 |
| SD6 | 3.3180 | 3.3176 | 3.1810 | 4.2745 | 4.1594 | 4.2990 |
| SD7 | 4.1960 | 4.2461 | 4.1426 | 5.0657 | 4.9940 | 5.1200 |

The imaging lens system according to the examples may generally have optical characteristics as follows. For example, a total length TTL of the imaging lens system is in a range of 5.7 to 8.8 mm, a total focal length is in a range of 4.8 to 7.4 mm, a focal length of the first lens is in a range of 5.0 to 6.7 mm, a focal length of the second length is in a range of −20 to −10 mm, a focal length of the third lens is in a range of 20 to 60 mm, a focal length of the fourth lens is in a range less than −15 mm, a focal length of the fifth lens is in a range of greater than 100 mm or less than −30 mm, a focal length of the sixth lens is in a range of 3.0 to 9.0 mm, and a focal length of the seventh lens is in a range of −5.6 to −2.2 mm. Further, an angle of view FOV of the imaging lens system is in a range of 78 to 88 degrees.

Table 14 illustrates conditional expression values of the imaging lens system according to the first example to the sixth example.

TABLE 14

| Conditional expression | First Example | Second Example | Third Example | Fourth Example | Fifth Example | Sixth Example |
|---|---|---|---|---|---|---|
| f1/f | 0.9581 | 0.9625 | 0.9709 | 0.9083 | 0.8973 | 0.9582 |
| V1−V2 | 36.85 | 36.85 | 36.85 | 36.84 | 36.84 | 37.67 |
| V1−V3 | 0 | 0 | 0 | −0.01 | −0.01 | −0.01 |
| V1−V4 | 35.75 | 35.75 | 35.75 | 35.74 | 32.57 | 37.67 |
| V1−V5 | 18.74 | 18.74 | 18.74 | 18.73 | 18.73 | 18.73 |
| f2/f | −2.4147 | −2.4392 | −2.4073 | −2.2051 | −2.1583 | −2.4926 |
| f3/f | 4.4594 | 4.3697 | 5.9645 | 6.2369 | 6.1507 | 7.4219 |
| f4/f | −3.3851 | −3.4081 | −4.0742 | −8.3378 | −7.4963 | −8.1920 |
| f5/f | −48.608 | −50.743 | 85.337 | −10.699 | −5.401 | 27.941 |
| f6/f | 0.7188 | 0.7252 | 0.7405 | 1.0680 | 0.9692 | 1.1706 |
| f7/f | −0.5644 | −0.5653 | −0.5709 | −0.7094 | −0.7013 | −0.6953 |
| TTL/f | 1.2306 | 1.2316 | 1.2182 | 1.1532 | 1.1532 | 1.1565 |
| f1/f2 | −0.3968 | −0.3946 | −0.4033 | −0.4119 | −0.4158 | −0.3844 |
| f2/f3 | −0.5415 | −0.5582 | −0.4036 | −0.3536 | −0.3509 | −0.3358 |
| BFL/f | 0.1902 | 0.1904 | 0.1812 | 0.1351 | 0.1353 | 0.1347 |
| D12/f | 0.0302 | 0.0304 | 0.0341 | 0.0267 | 0.0257 | 0.0296 |
| SD5/IH | 0.4935 | 0.4938 | 0.4824 | 0.5117 | 0.5101 | 0.4976 |
| SD6/IH | 0.7135 | 0.7135 | 0.6841 | 0.7116 | 0.6924 | 0.7157 |
| SD7/IH | 0.9024 | 0.9131 | 0.8909 | 0.8433 | 0.8314 | 0.8523 |

As set forth above, according to the examples, performance of a compact camera may be improved.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:
1. An imaging lens system comprising:
a first lens comprising a refractive power;
a second lens comprising a negative refractive power;
a third lens comprising a refractive power;
a fourth lens comprising a refractive power;
a fifth lens comprising a refractive power and a convex object-side surface in a paraxial region;
a sixth lens comprising a refractive power; and
a seventh lens comprising a refractive power,
wherein the imaging lens system includes a total number of seven lenses with refractive power and the first to seventh lenses are sequentially disposed from an object side toward an imaging plane,
wherein a radius of curvature of an object-side surface of the third lens is greater than a radius of curvature of an image-side surface of the first lens,
wherein TTL/2HI<0.730, where TTL is a distance from an object-side surface of the first lens to the imaging plane and 2HI is a diagonal length of the imaging plane, and
wherein 30<V5<50, where V5 is an Abbe number of the fifth lens.

2. The imaging lens system of claim 1, wherein the first lens has a convex object-side surface.

3. The imaging lens system of claim 1, wherein the second lens has a convex object-side surface.

4. The imaging lens system of claim 1, wherein the third lens has a convex object-side surface.

5. The imaging lens system of claim 1, wherein the sixth lens has a convex object-side surface.

6. The imaging lens system of claim 1, wherein the seventh lens has a concave object-side surface.

* * * * *